United States Patent [19]
Fingerson et al.

[11] Patent Number: 4,939,618
[45] Date of Patent: Jul. 3, 1990

[54] LIGHTNING PROTECTED ELECTRIC FENCE CONTROLLER SYSTEM AND METHOD

[75] Inventors: Conrad F. Fingerson, Chatfield, Minn.; Andrew J. McKean, Avalon, Australia; Robert D. Eickhoff, Fountain, Minn.

[73] Assignee: AMCO Partnership, Chatfield, Minn.

[21] Appl. No.: 405,578

[22] Filed: Sep. 11, 1989

Related U.S. Application Data

[63] Continuation of Ser. No. 188,651, Apr. 29, 1988, abandoned, which is a continuation of Ser. No. 877,108, Jun. 23, 1986, abandoned.

[51] Int. Cl.$^5$ .............................................. H02H 9/06
[52] U.S. Cl. .................................... 361/117; 361/129; 361/130; 361/56; 307/132 R; 337/29
[58] Field of Search ................. 361/39, 40, 111, 120, 361/126–130, 118, 117, 232, 56; 337/28–33; 307/132 R, 132 EA, 132 M

[56] References Cited

U.S. PATENT DOCUMENTS

| | | | |
|---|---|---|---|
| 3,441,803 | 4/1969 | Christener | 361/128 X |
| 3,581,299 | 5/1971 | Schmit | 307/132 R |
| 3,655,995 | 4/1972 | Malme | 307/132 R |
| 3,679,939 | 7/1972 | Nitta et al. | 361/129 X |
| 3,743,884 | 7/1973 | Wafer et al. | 361/129 X |
| 3,865,452 | 2/1975 | Pittman | 339/14 T |
| 3,868,545 | 2/1975 | Caron | 315/209 |
| 3,873,847 | 3/1975 | Finch et al. | 307/132 R X |
| 3,988,594 | 10/1976 | Low et al. | 307/132 R |
| 4,277,719 | 7/1981 | Riggins | 361/127 |
| 4,477,857 | 10/1984 | Crocker | 361/118 X |
| 4,486,805 | 12/1984 | Cline | 361/133 |

*Primary Examiner*—Todd E. DeBoer
*Attorney, Agent, or Firm*—Merchant, Gould, Smith, Edell, Welter & Schmidt

[57] ABSTRACT

An electric fence controller (20) interconnected to electric fence terminals (136, 138) by a three terminal spark gap arrangement (140) one terminal (142) being interconnected to the fence hot terminal (136), a second terminal (144) being interconnected to the fence ground terminal (138) and a third terminal (146) being interconnected to utility ground (48). High voltage surges on the electric fence will thus be diverted either to the local fence ground terminal (138) or to the utility ground (48) whichever ground has the least resistance to ground thereby assuring an effective ground so as to prevent damage due to lightning strikes.

5 Claims, 6 Drawing Sheets

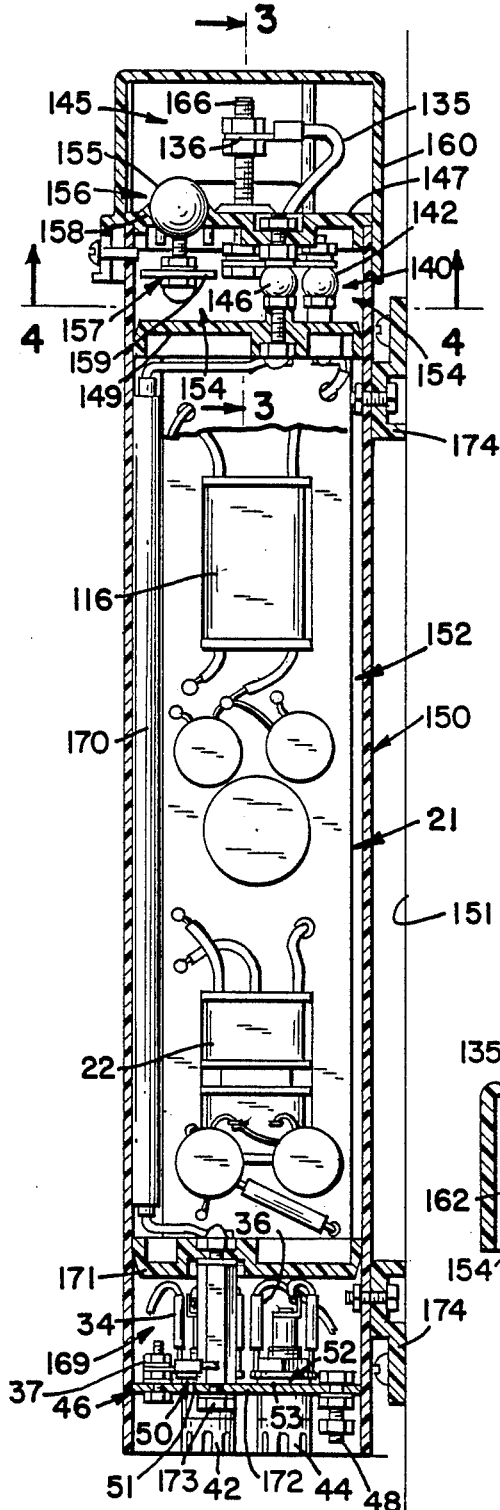
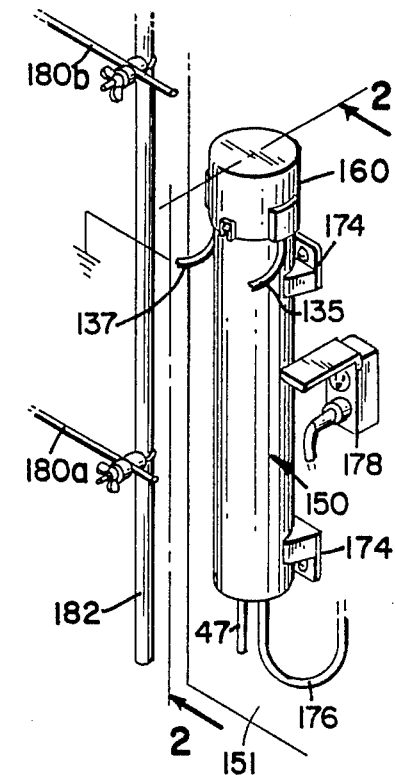
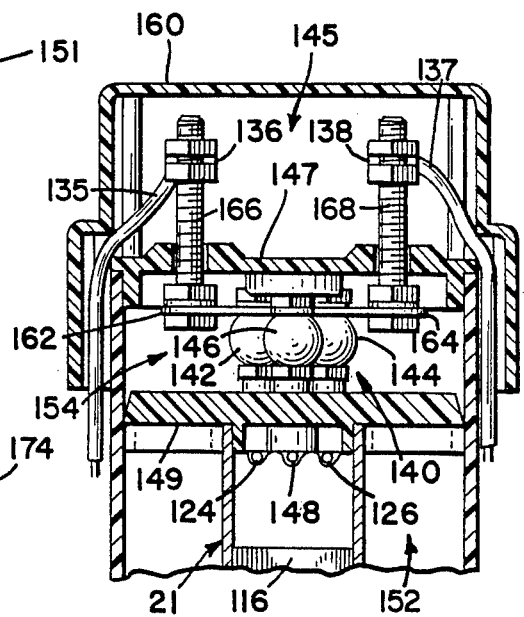
FIG. 1
FIG. 2
FIG. 3

LIGHTNING PROTECTED ELECTRIC FENCE CONTROLLER SYSTEM AND METHOD

This is a continuation of application Ser. No. 188,651, filed Apr. 29, 1988, which in turn is a continuation of Ser. No. 877,108, filed June 23, 1986, all abandoned.

BACKGROUND OF THE INVENTION

The present invention relates to a lightning protected fence controller system and method. More particularly, the present invention relates to a lightning protected electric fence controller system and method for protecting electric fence controller circuitry from induced voltage surges fed back along the electric fence line as a result of lightning strikes.

Electric fence controllers have long been used for controlling the charge on an electrified fence. As is well known; see for example U.S Pat. Nos. 3,655,955; 3,868,545; and 3,988,594, electric fence controllers are designed to impress an electric charge on a fence containing an electrically conducting wire, often made of an iron metal. The electric charge typically lasts only milliseconds and is repeatedly applied at predetermined spaced time intervals.

A common cause of damage to electric fence controllers are lightning strikes during thunderstorms which cause high voltage transients that damage the circuitry of the electric fence controller. Such high voltage transients are typically generated by lightning striking power lines, the electric fence wire, or adjacent to the electric fence wire, thereby inducing high transient voltages which eventually reach the circuitry of the electric fence controller. Thus, there is a need for protecting electric fence controllers against such lightning strikes. The previously referenced three patents all make reference to provisions in their design for protecting the electric fence controller from such lightning strikes.

With advances in electric fence controller design, fence construction, and insulation, very long multi-wire electric fences are now common, with total wire lengths of fifty or more miles not uncommon. As the length of electric fences and number of wires used increases and as the isolation of these wires from ground improves, the problem of lightning strikes also increases. The modern farmer or other user of electric fences needs a more reliable electric fence controller that will survive repeated high voltage surges induced by lightning strikes.

Some of the typical approaches currently used to reduce lightning related failure of electric fence controllers includes (1) fitting a simple spark gap across the electric fence controller output terminals, (2) installing a series choke/spark gap between the electric fence controller and the electric fence, (3) installing one or more spark gap diverters at points along the electric fence, (4) making the top wire of a multi wire fence a ground (shield) wire, and (5) protecting semiconductors with metal oxide varistors.

None of the above approaches have proved completely effective. One through four rely on the user installing a very low resistance ground rod and a high current, critically adjusted spark gap. Frequently, the "user installed" ground rod is ineffective and a high voltage induced surge will travel back down the electric fence line on all wires, live and ground, seeking the lowest resistance path to true ground.

In the case of a power line operated controller, the power line itself is a much lower resistance path to ground than most "user installed" local grounds, this is especially so when the ground temperature drops or is frozen and the soil resistance is very high. A high voltage surge can exceed 50,000 volts and on reaching the controller terminals, a dielectric breakdown (flashover) occurs within the electric fence controller, arcing across from the fence terminal components to the AC line input components. This flashover will destroy all or most semiconductors, burn out transformers, and in the extreme case, cause the controller to actually explode due to rapid expansion of the entrapped gases in the controller due to the heating effect of the high current arc discharge.

As regards the fifth approach, metal oxide varistors provide good protection to semiconductors, but very large and expensive metal oxide varistors are needed to withstand the extremely high energy levels induced in electric fences during a severe thunderstorm.

Lightning induced surges are also common on AC power lines and account for many of the lightning related failures of electric fence controllers.

The present invention provides an improved system and method of lightning protection for electric fence controllers due to lightning induced surges on both the fence wire and on the AC power line.

SUMMARY OF THE INVENTION

The present invention relates to an electric fence controller for electrifying an electric fence. The electric fence controller of the present invention includes an energy storing circuit means for storing electrical energy. Energy charging circuit means is interconnected to the energy storing circuit means for charging the energy storing circuit means. Discharging circuit means is interconnected to the energy storing circuit means for discharging the energy storing circuit means. Voltage multiplying means is interconnected to the energy storing circuit means for impressing high voltage potentials at spaced apart intervals on the electric fence. Three terminal spark gap means including three spaced apart terminals interconnects the voltage multiplying means to the electric fence. The three terminal spark gap means includes a first terminal and a second terminal interconnecting the voltage multiplying means to a hot wire of the electric fence and a ground wire of the electric fence, respectively. A third terminal of the three terminal spark gap means is interconnected to a utility ground.

A particular advantage of the present invention is the presence of a three terminal spark gap arrangement on the fence side of the electric fence controller, a first and second one of the three terminals interconnecting the electric fence controller to the fence hot or positive terminal and the fence ground or negative terminal. A third one of the three terminals being interconnected to the utility ground. This arrangement assures that at least one grounding system; i.e., the utility ground or the local fence ground, will be effective in preventing extremely high voltage transients from reaching the controller electronic component. Moreover, the fact that the terminal interconnected to the fence hot or positive terminal is spaced apart from the terminal interconnected to the utility ground, assures that impulses from the electric fence controller will not be applied to the utility circuits which could affect other farm operations. The present invention thus provides the presence of the utility ground as well as the local fence ground to protect the electric fence controller from lightning strikes. Thus, if the local fence ground is not installed properly, a proper ground via the utility ground will be assured. In addition, in some areas of the country, it is extremely difficult to install a grounding system that is as effective as the utility grounding system. Thus, the use of the utility ground system will greatly enhance electric fence controller reliability and with the use of the spark gap between the terminal interconnected to the fence hot or positive and the terminal interconnects to the utility ground, one can be ensured that impulses from the electric fence controller will not be carried to the other electrical systems.

In a preferred embodiment of the present invention, the three terminal spark gap arrangement includes three spheres critically spaced and rigidly mounted. In one preferred embodiment, the spheres are made of brass or stainless steel.

In one preferred embodiment of the present invention, power line surge protection is provided by two spark gaps, from each side of the 110 volt AC line to utility ground. In addition, each side of the AC line includes a series choke and is interconnected to the utility ground by a metal oxide varistor. In addition, the two sides of the 110 volt AC line are interconnected to each other by a metal oxide varistor.

Yet another preferred embodiment of the present invention further includes metal oxide varistors providing for protection of critical semiconductors throughout the electric fence controller circuitry.

Still another advantage of the present invention is the provision of a self-contained, weather resistant fence controller with all electronic components sealed in a water tight and near air tight compartment.

In the preferred embodiment of the invention illustrated in this application, the three terminal spark gap is positioned in a spark gap compartment that includes a pressure release valve so as to allow escape of the rapidly expanding gases created by arc discharges across the three terminal spark gap. The spark gap compartment is designed to keep moisture, dirt and debris, and insects from the spark gap area. Intrusion of foreign particles and moisture could affect the breakdown voltage of the spark gap causing impulses from the electric fence controller to be carried to other electrical systems on the farm or ranch.

Additionally, in a preferred embodiment, very high dielectric isolation is achieved by vacuum epoxy encapsulation of transformers, careful layout of PCB and components and two transformer design.

Various advantages and features of novelty which characterize the invention are pointed out with particularity in the claims annexed hereto and forming a part hereof. However, for a better understanding of the invention, its advantages, and object attained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views, FIG. 1 is a view in perspective of an embodiment of an electric fence controller in accordance with the principles of the present invention mounted adjacent an electric fence;

FIG. 2 is an enlarged view as seen generally along a line 2—2 of FIG. 1;

FIG. 3 is an enlarged view as seen generally along a line 3—3 of FIG. 2;

FIG. 12 is a schematic of spark gap arrangement embodiment of FIG. 9.

DETAILED DESCRIPTION OF A PREFERRED EMBODIMENT

Figure 7:
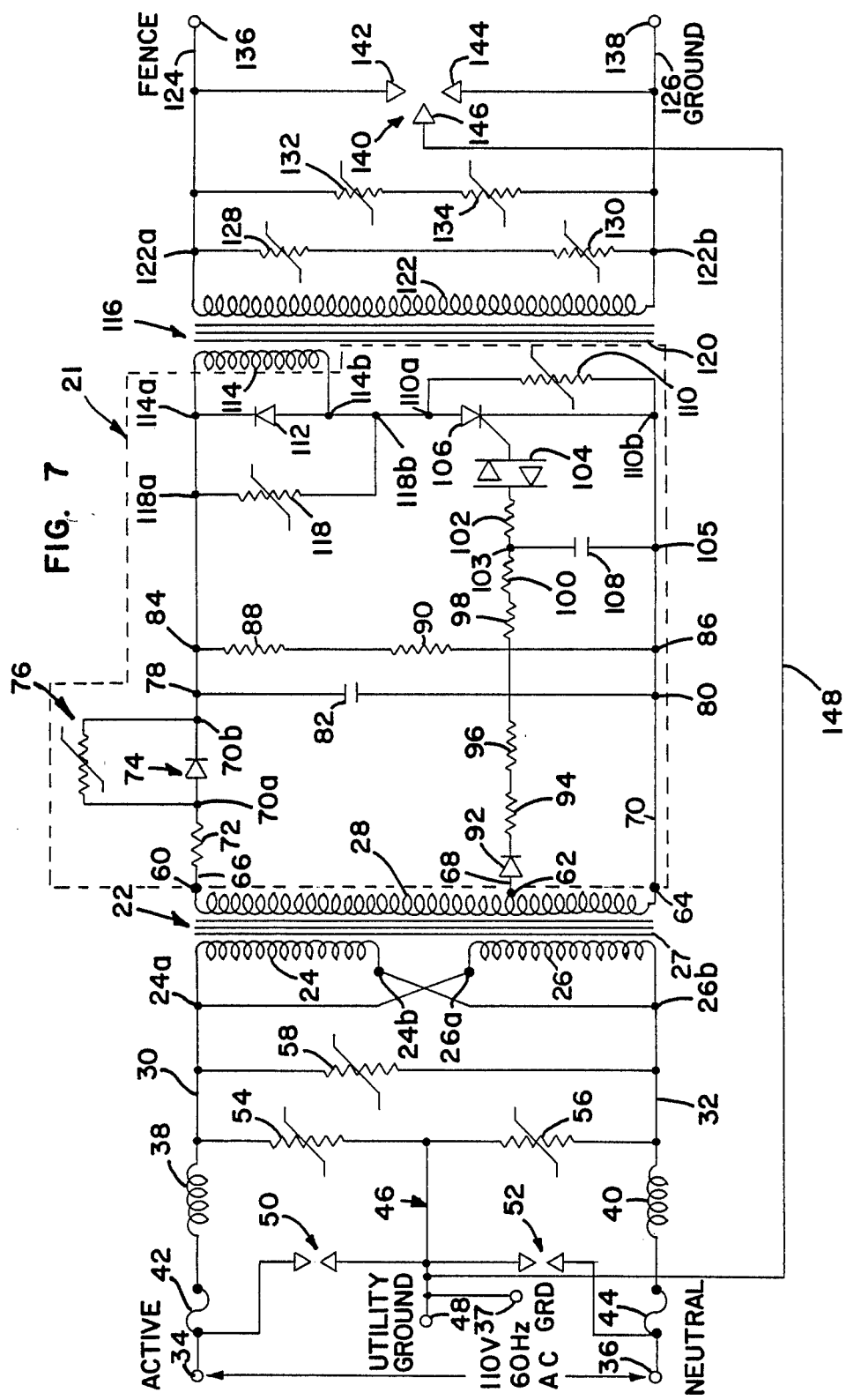
FIG. 7 is a schematic of an embodiment of an electric fence controller circuitry in accordance with the principles of the present invention.

Illustrated in FIGS. 1 through 7 is a preferred embodiment of an electric fence controller, generally referenced by the reference numeral 20, in accordance with the principles of the present invention. As illustrated in FIG. 7, the electric fence controller includes a transformer 22 having first and second primary windings 24,26, a secondary winding 28, and a core 27. First and second primary windings 24,26 are adapted to be supplied with energy by conductors 30,32 interconnected to active (+) and neutral (−) terminals 34,36, in turn interconnected to corresponding wires of a conventional 110 volt, 60 cycle AC power line. Each of the conductors 30,32 includes a choke 38,40 in series with a fuse 42,44, respectively. Intermediate of the fuses 42,44 and the terminals 34,36, respectively, each of the conductors 30,32 is interconnected to a conductor 46 by spark gaps 50,52 respectively, the conductor 46 being interconnected to a ground terminal 37 which in turn is interconnected to a ground wire of the AC power line and a utility ground terminal 48 which in turn is preferably interconnected to utility ground. In locations wherein it is difficult or impossible to interconnect to utility ground, the terminal 48 might be interconnected to a neutral lead of the power line. Each of the conductors 30,32 is further interconnected to the conductor 46 by a varistor 54,56 respectively. In the preferred embodiment, the conductor 46 comprises a cylindrical plate 172 thereby facilitating attachment of components to electrical ground. In turn, the conductors 30,32 are interconnected to one another by a varistor 58. Conductor 30 is interconnected to a terminal 24a of the first primary winding 24 and a terminal 26a of the second primary winding 26. The conductor 32 is in turn interconnected to a terminal 24b of the first primary winding 24 at a terminal 26b of the second primary winding 26.

Instead of the primary windings 24,26 being energized from a power line, a battery may be used as a source of power, the battery current being interrupted by suitable means such as a blocking oscillator, chopper or the like.

A secondary winding has terminals 60,62,64. The terminals 60,62,64 are interconnected to conductors 66,68,70 respectively. Interconnected in series with the terminal 60 is a resistor 72 and a halfwave rectifier 74, the resistor 72 being interconnected to the anode terminal of the rectifier 74. Interconnected in parallel with the rectifier 74 across terminals 70a,b is a metal oxide varistor 76. Interconnecting the conductors 66,70 across terminals 78,80 is a capacitor 82. Interconnected in parallel with the capacitor 82 across the conductors 66,70 at terminals 84,86 are resistors 88,90. Interconnected to the terminal 62 is a rectifier 92 at its anode terminal. The rectifier 92 is in series with resistors 94,96,98,100,102. Interconnected across the conductors 68,70 at terminals 103,105 is a capacitor 108. Interconnected to the resistor 102 is a Diac 104. The Diac 104 is interconnected to a silicon controlled rectifier (SCR) 106. Interconnected in parallel with the silicon controlled rectifier 106 across terminals 110a,b is a metal oxide varistor 110. The silicon controlled rectifier 106 is interconnected to the conductor 70 at the terminal 110b. A rectifier 112 is interconnected across input terminals 114a,b of a secondary winding 114 of a transformer 116. Interconnected in parallel with the rectifier 112 across terminals 118a,b is a metal oxide varistor 118. The transformer 116 includes a core 120 and a secondary winding 122. The secondary winding 122 is interconnected to conductors 124,126 by output terminals 122a,b. The conductors 124,126 are interconnected by voltage dependent resistors 128,130 in series and voltage dependent resistors 132,134 in series. The conductors 124,126 are interconnected to a hot or positive terminal 136 which is interconnected to a corresponding wire(s) of the electric fence and a ground or negative terminal 138 interconnected to local ground or a corresponding wire of the electric fence, respectively.

A three terminal spark gap arrangement 140 including spaced apart terminals 142,144,146 is provided. The terminal 142 is interconnected to the fence hot terminal 136, the terminal 144 is interconnected to the fence ground terminal 138 and the terminal 146 is interconnected to a conductor 148 interconnected to the utility ground terminal 48.

Figure 4:
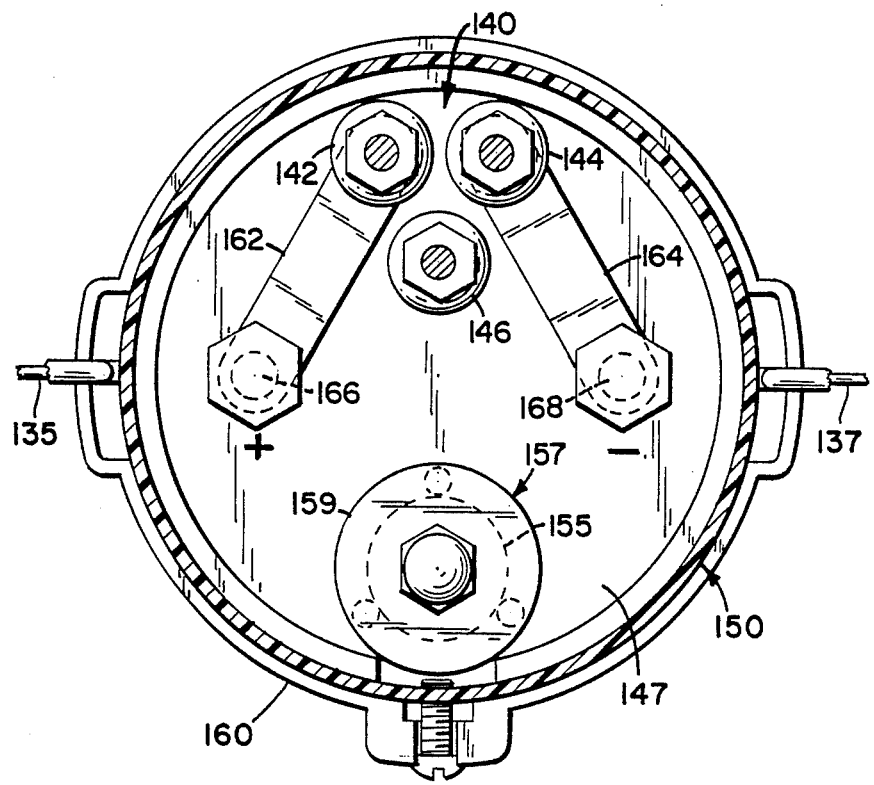
FIG. 4 is an enlarged view as seen generally along a line 4—4 of FIG. 2.
Figure 6:
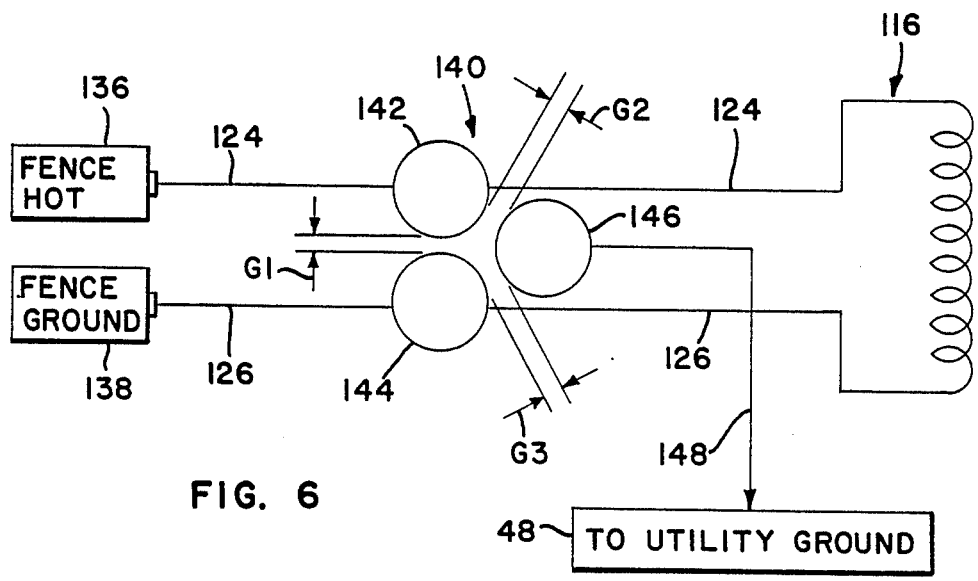
FIG. 6 is a diagrammatic view of an embodiment of a three terminal spark gap arrangement in accordance with the principles of the present invention.
Figure 5:
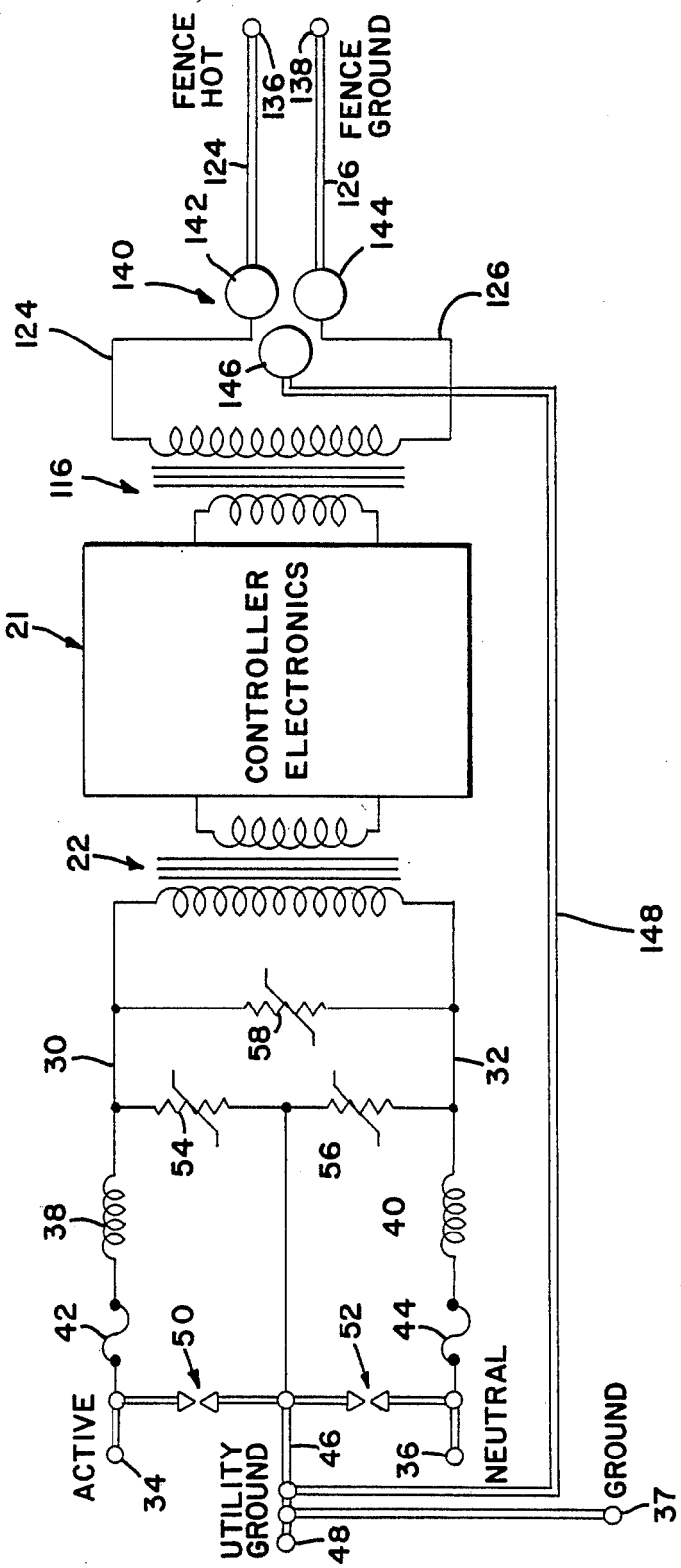
FIG. 5 is a block diagram of an embodiment of an electric fence controller circuitry in accordance with the principles of the present invention.

The spark gap arrangements of the electric fence controller 20 of the present invention provide for high voltage transient paths as generally illustrated by the enlarged emphasized lines of FIG. 5 such that any voltage surges due to lightning strikes will bypass the electric fence controller circuitry and not damage the electric fence controller circuitry. In the preferred embodiment, the terminals 142,144,146 of the three terminal spark gap arrangement 140 comprise three electrically conductive 13 millimeter (mm) diameter solid brass spheres critically spaced and rigidly mounted, with an air gap of 8 to 10 KV. The spacing G1 between the terminals 142 and 144 is preferably substantially 0.070 inches (1.60 mm) while the spacing G2,G3 of the terminals 142,144 from the terminal 146 is preferably substantially 0.100 inches (2.25 mm) with the diameter of the terminals being substantially one half inch (13.0 mm). The air gap could be altered to accommodate a fence controller with lower or higher output voltages. The diameter or material of the spheres is not critical except they should be of a material that will not corrode and materially affect the spark gap.

In use, the electric fence controller 20 develops a short duration pulse, typically 150 microseconds in duration, which is impressed on the fence at a repetition rate of 45 to 55 pulses per minute with a peak no load amplitude of 5,000 to 6,000 volts and an energy value of 3 joules. The transformer 22, steps the AC line voltage to 600 volts AC and provides a high degree of input/output isolation. The halfwave rectifier 74, charges the storage capacitor 82 through thermal (overpulsing) fuse resistor 72 to a potential of 800 to 900 volts DC. The rectifier 92 charges the timing capacitor 108 through the timing resistors of 94,96,98,100 and the Diac 104 conducts at approximately 30 volts discharging the timing capacitor 108 and triggering the SCR/thyristor which discharges the capacitor 82 through the primary winding 114 of the transformer 116. The transformer 116 steps (multiplies) the voltage up to 5,000 to 6,000 volts and matches the capacitor 82 to the fence line for optimum power transfer. The rectifier 112 absorbs the back EMF of the transformer collapsing field. The metal oxide varistors 76,118,110 protect their corresponding semiconductors from damage. The voltage dependent resistors 128,130,132,134 absorb minor high voltage transients above 6,000 volts. Power line surge protection is provided by the two spark gaps 50,52, from each side of the 110 volt AC line to the utility ground conductor 46, the two chokes 38,40 and the three metal oxide varistors 54,56,58.

As illustrated in FIGS. 1 through 4, the circuitry of the electric fence controller is preferably mounted in an elongated cylindrical housing 150 which seals the electronic components in a substantially air and water tight compartment 152. In addition, the spark gap arrangement 140 is positioned in a compartment 154 of the housing 150 between plates 147,149 and includes a gravity assisted pressure relief valve mechanism 156 mounted in the plate 147 to allow escape from the compartment 154 of the rapidly expanding gases created by arc discharges across the three terminal spark gap arrangement 140. The electric fence controller is thus protected from the elements and will not be damaged by rapidly expanding gases. In FIG. 2, the valve mechanism 156 is shown in the closed or sealed position. The valve mechanism 156 includes a sphere 155 interconnected to a stem portion 157 extending into the compartment 154, the stem portion 157 including a washer 159. In the closed position, the sphere 155 forms a seal with a lip portion 158. When an arc occurs, the sphere 155 is forced upward into a compartment 145 allowing the escape of gases between the stem portion 157 and the lip portion 158 into the compartment 145 which is in communication with the ambient air.

In the embodiment of the electric fence controller 20 illustrated in FIGS. 1 through 4, the three terminal spark gap arrangement 140 is mounted in the substantially water tight compartment 154. The brass spheres 142,144 are mounted on two horizontally projecting members 162,164 which in turn are interconnected to two vertically projecting members 166,168 which form the terminals 136,138, the terminals 136,138 being interconnected to corresponding fence "hot" wires 180 and "ground" wires 180b by conductors 135,137. A removable cover 160 encloses the valve mechanisms 156 and the members 166,168. The conductor 148 interconnecting the brass sphere 146 to the utility ground terminal 48 includes an insulated copper rod 170 running along a side of the electric fence controller circuitry. The insulated rod 170 is suitably interconnected to a metal plate 172 by a spacer member 173 at a back end of the electric fence controller housing 150 so as to ground the entire plate surface. The plate 172 in the preferred embodiment functions as the conductor 46. The spark gaps 50,52 are positioned in a compartment 169 between the plate 172 and a plate 171. In the embodiment shown in FIGS. 1-7, the spark gaps 50,52 are formed by the thickness of a dielectric washer 51,53 separating the fuses 42,44 from the plate 172.

Illustrated in FIGS. 9-12 is an alternate preferred embodiment of the present invention wherein the spark gaps 50,52 are replaced by a three terminal arrangement 240, having terminals 242,244,246. In the preferred embodiment, the terminals comprise solid brass or stainless steel spheres similar to those of the three terminal spark gap arrangement 140 at the output side of the electric fence controller. The electrically conducting metal spheres of the terminals 242,244,246 are substantially 13 millimeters in diameter, or approximately 0.5 inches. The sphere 246 is electrically interconnected to the plate 172 which is interconnected to the utility ground terminal 48. The other terminals 242,244 are interconnected to the AC power line hot wire 34 and neutral wire 36. The spheres 242,244 are insulated from the utility ground plate 172 by a dielectric mounting plate 248, such as a fiberglass plate. The spacing between the three spheres 242,244,246 are all equal, substantially 1.5 millimeters (0.07 inches).

During normal use; i.e., at normal fence voltages; e.g., up to eight thousand volts and normal AC line input voltages; e.g., up to 500 volts AC, the gaps between the terminals 142,144,146 and 242,244,246 are such that arcing does not occur.

Figure 8:
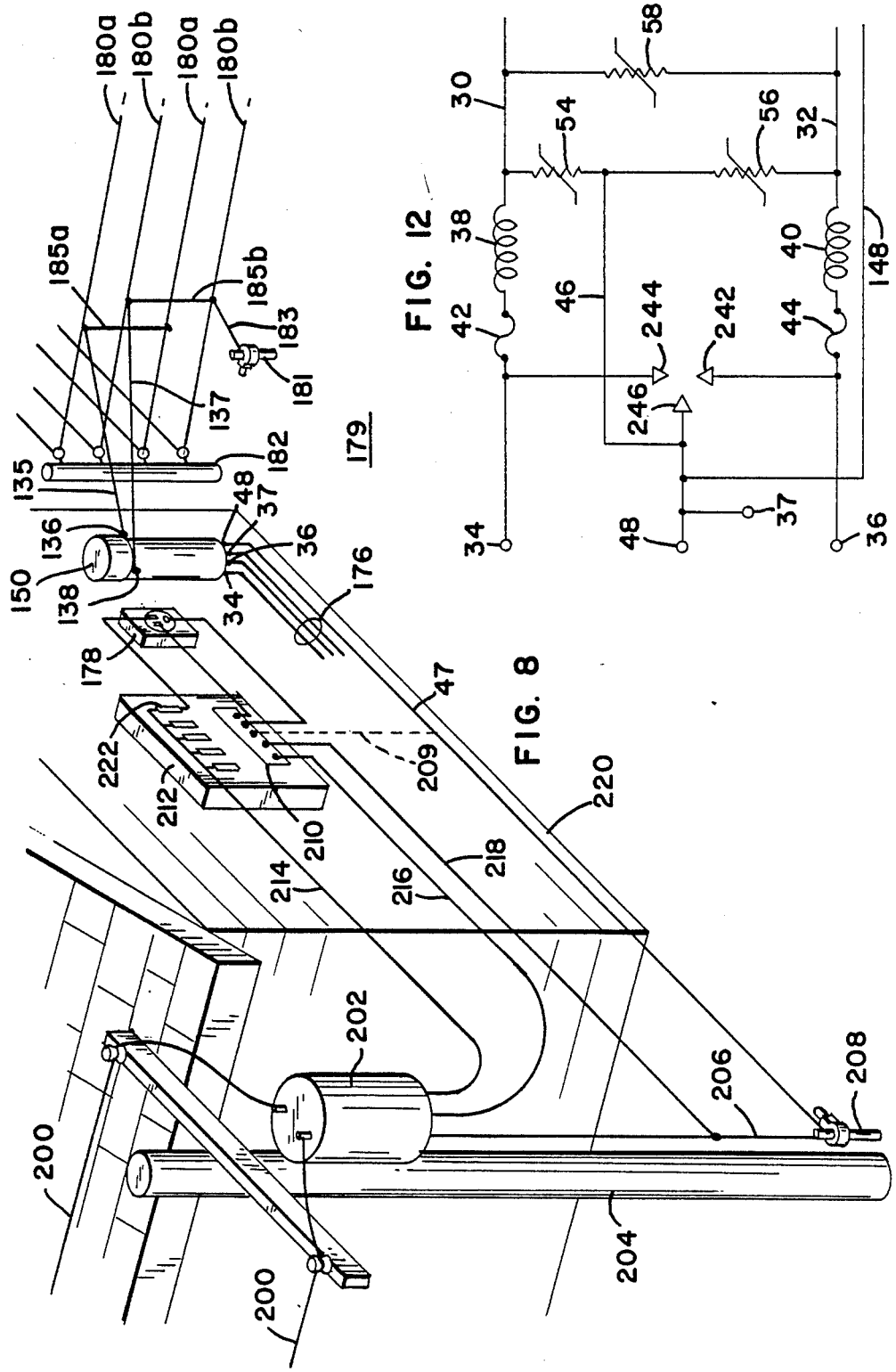
FIG. 8 is an overall diagrammatic view of an electric fence controller installation in accordance with the principles of the present invention.
Figure 9:
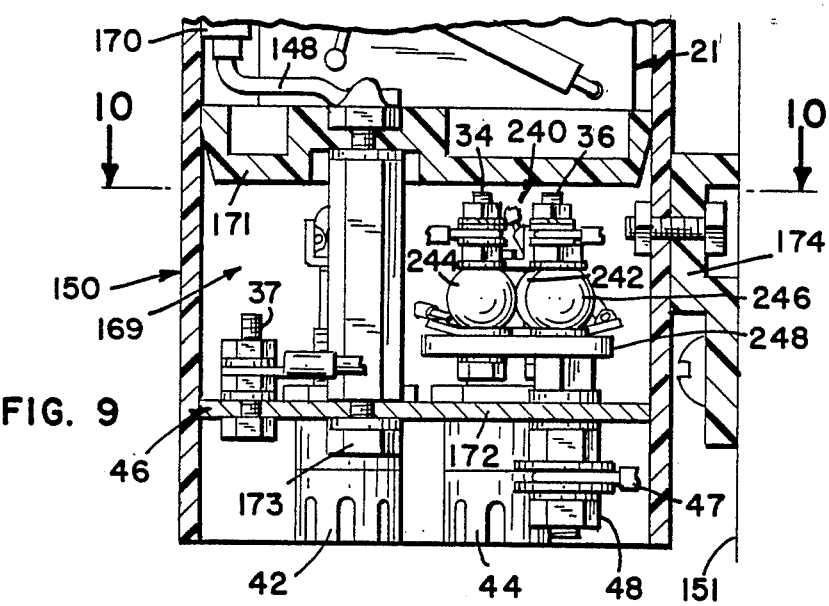
FIG. 9 is a fragmentary vertical section of a lower portion of an alternate embodiment of the present invention.
Figure 10:
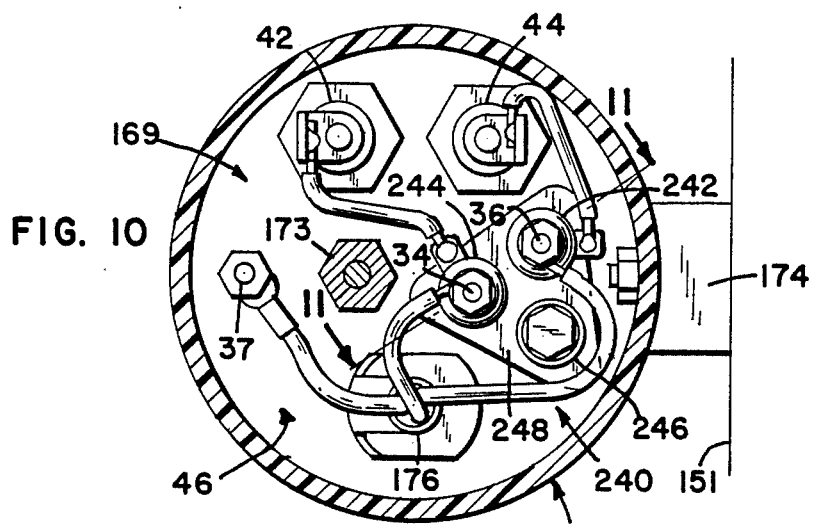
FIG. 10 is a view as seen generally along a line 10—10 of FIG. 9.
Figure 11:
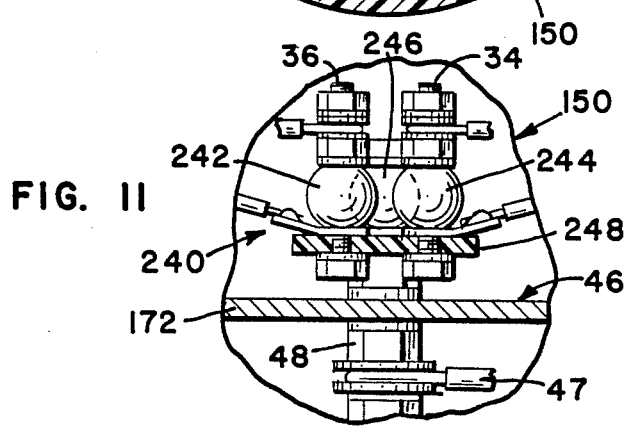
FIG. 11 is a view as seen generally along a line 11—11 of FIG. 10.

The utility ground terminal 48 is mounted on the plate 172 to provide for interconnection preferably to the utility ground. As discussed, where utility ground is not readily available, it might be interconnected to the neutral of the AC line. As illustrated in FIG. 1, the housing 150 will include suitable brackets 174 for mounting the housing 150 in place on a structure 151. An electrical cord 176 is illustrated as being interconnected to a suitable AC outlet 178. The utility ground terminal 48 is interconnected by a conductor 47 to the utility ground. The fence wires 180a,b are shown mounted on a support 182. The ground wire 180b is interconnected by a conductor 183 to a user installed ground rod 181 driven into a surface 179 of the ground as illustrated in FIG. 8. There may be multiple "ground" wires and "hot" as further illustrated in FIG. 8, the wires being interconnected by conductors 185a,b.

Illustrated in FIG. 8 is a diagrammatic view of a typical operating environment of the present invention. Incoming 7500V AC power lines 200 are fed into a transformer 202 on a utility pole 204. A lead 206 is interconnected to a utility ground rod 208 which in turn is preferably interconnected to the utility ground terminal 48 at the electric fence controller housing 150 by the conductor 47. As illustrated by the broken line 209, in the alternative, the utility ground terminal 48 is interconnected to a neutral ground bus terminal strip 210 in a main circuit box 212 by the conductor 209. The conductors 47 and 209 are preferably made of a thick copper wire of at least 12½ gauge. An active lead 214, a neutral lead 216, and a utility ground lead 218 are interconnected to the main circuit breaker box 212 in a farm utility building 220. The active lead 214 is interconnected to circuit breakers 222, and the utility ground lead 218 and the neutral lead 216 are interconnected to the neutral ground bus terminal strip 210. Active, neutral and ground wires extend to the outlet 178 and other outlets in the AC wiring system. The electric fence controller 20 is interconnected to the outlet 178 by a cord 176 such that the active, neutral, and ground wires are interconnected to terminals 34, 36, and 37, respectively.

In the event that a connection is not made between the utility ground terminal 48 and the utility ground rod 208, or the neutral connector strip 210, or the neutral wire at the line outlet socket 178, and if a three wire to two wire adapter is used, and if the "user installed" fence ground rod 181 is ineffective (a worse case scenario), the controller electronics will still be protected as the path for a lightning induced current surge will bypass the electronics. The surge in this case will enter the electronic fence controller 20 on either conductor 135,137, arc across from terminals 142,144 to 146, travel along the conductor 148 to the ground plate 172, then arc across either of the spark gaps 50,52 to the neutral side of the AC line and then travel through the AC line cord 176, through the two pin outlet socket 178, along the AC wiring to the breaker box neutral ground bus terminal strip 210 to the utility ground rod 208. The magnitude of the diverted current will be considerably reduced due to the series inductance of the AC power lead and the building wiring.

It is to be understood that even though the above numerous characteristics and advantages of the invention have been set forth in the foregoing description, together with details of the structure and function of the invention, the disclosure is illustrative only, and changes may be made in detail, especially in matters of shape, size and arrangement of parts within the principles of the invention, to the full extent indicated by the broad general meaning of the terms in which the appended claims are expressed.

What is claimed is:

1. An electric fence controller used in electrifying electric fence, comprising:
   (a) energy storing circuit means for storing electrical energy;
   (b) energy charging circuit means in and connected to said energy storing circuit means for charging said energy storing circuit means;
   (c) discharge circuit means interconnected to said energy storing circuit means for discharging said energy storage circuit means;
   (d) voltage multiplying circuit means interconnected to said energy storage circuit means and the electric fence for impressing high voltage potentials at intervals on the electric fence; and
   (e) three terminal spark gap means positioned intermediate of the voltage multiplying circuit means and the electric fence including three spaced-apart terminals forming three separate and distinct spark gap paths, each spark gap path being defined between a unique pair of the three spaced-apart terminals, a first terminal and a second terminal of the three terminal spark gap means interconnected to a hot wire of the electric fence and a ground wire of the electric fence, respectively, a third terminal of the three terminal spark gap means being interconnected to a utility ground, each of the terminals of the three terminal spark gap means comprising a spherical member made of a conductive material, the three terminal spark gap means being exposed in a substantially watertight compartment, pressure relief valve means and including a gravity operated valve normally in a closed state being associated with the compartment for allowing escape of rapidly expanding gasses created by arc discharges across the three terminal spark gap means.

2. An electric fence controller used in electrifying an electric fence, comprising:
   (a) energy storing circuit means for storing electrical energy;
   (b) energy charging circuit means interconnected to said energy storing circuit means for charging said energy storing circuit means, the energy charging circuit means including first transformer means, input terminals of the first transformer means being interconnected to active and neutral leads from a source of electrical energy, each of the active and neutral leads including first and second circuit means for interconnecting the active and neutral leads to a utility ground, the first circuit means including a spark gap, the second circuit means including a varistor and choke in series, a third varistor being in parallel with the first transformer means interconnecting the active and neutral leads from the source of electrical energy;
   (c) discharge circuit means interconnected to said energy storing circuit means for discharging said energy storage circuit means;
   (d) voltage multiplying circuit means interconnected to said energy storage circuit means and the electric fence for impressing high voltage potentials at intervals on the electric fence; and
   (e) three terminal spark gap means positioned intermediate of the voltage multiplying circuit means and the electric fence including three spaced apart terminals, a first terminal and a second terminal of the three terminal spark gap means interconnected to a hot wire of the electric fence and a ground wire of the electric fence, respectively, a third terminal of the three terminal spark gap means being interconnected to a utility ground.

3. An electric fence controller used in electrifying an electric fence, comprising:
   (a) energy storing circuit means for storing electrical energy;
   (b) energy charging circuit means interconnected to said energy storing circuit means for charging said energy storing circuit means;
   (c) discharge circuit means interconnected to said energy storing circuit means for discharging said energy storage circuit means;
   (d) voltage multiplying circuit means interconnected to said energy storage circuit means and the electric fence for impressing high voltage potentials at intervals on the electric fence; and
   (e) three terminal spark gap means positioned intermediate of the voltage multiplying circuit means and the electric fence including three spaced apart terminals, a first terminal and a second terminal of the three terminal spark gap means interconnected to a hot wire of the electric fence and a ground wire of the electric fence, respectively, a third terminal of the three terminal spark gap means being interconnected to a utility ground, each of the terminals of the three terminal spark gap means comprising a spherical member made of a conductive material, the three terminal spark gap means being disposed in a substantially water tight compartment, pressure relief valve means being associated with the compartment for allowing escape of rapidly expanding gases created by arc discharges across the three terminal spark gap means, the pressure release valve means including a gravity operated valve normally in a closed state.

4. An electric fence controller used in electrifying an electric fence, comprising:
   (a) energy storing circuit means for storing electrical energy;
   (b) energy charging circuit means interconnected to said energy storing circuit means for charging said energy storing circuit means;
   (c) discharge circuit means interconnected to said energy storing circuit means for discharging said energy storage circuit means;
   (d) voltage multiplying circuit means interconnected to said energy storage circuit means and the electric fence for impressing high voltage potentials at intervals on the electric fence;
   (e) three terminal spark gap means positioned intermediate of the voltage multiplying circuit means and the electric fence including three spaced apart terminals, a first terminal and a second terminal of the three terminal spark gap means interconnected to a hot wire of the electric fence and a ground wire of the electric fence by first and second circuitry, respectively, a third terminal of the three terminal spark gap means being interconnected to a utility ground by a third circuit separate and distinct from the first and second circuits, the third circuit bypassing the energy storing circuit means, the energy charging circuit means, the discharge circuit means, and the voltage multiplying circuit means; and
   (f) the energy charging circuit means including first transformer means, input terminals of the first transformer means being interconnected to active and neutral leads from a source of electrical energy, each of the active and neutral leads including first and second circuit means for interconnecting the active and neutral leads to a utility ground, the first circuit means including a spark gap, the second circuit means including a varistor and choke in series, a third varistor in parallel with the first transformer means interconnected the active and neutral leads from the source of electrical energy.

5. An electric fence controller used in electrifying an electric fence, comprising:
   (a) energy storing circuit means for storing electrical energy;
   (b) energy charging circuit means interconnected to said energy storing circuit means for charging said energy storing circuit means;
   (c) discharge circuit means interconnected to said energy storing circuit means for discharging said energy storage circuit means;
   (d) voltage multiplying circuit means interconnected to said energy storage circuit means and the electric fence for impressing high voltage potentials at intervals on the electric fence; and
   (e) three terminal spark gap means positioned intermediate of the voltage multiplying circuit means and the electric fence including three spaced apart terminals, each of the terminals including a spherical member made of conductive material, the three terminal spark gap means being disposed in a substantially water tight compartment, pressure release valve means being associate with the compartment for allowing escape of rapidly expanding gases created by arc discharges across the three terminal spark gap means, the pressure release valve means including a gravity operated valve normally in a closed state, a first terminal and a second terminal of the three terminal spark gap means interconnected to a hot wire of the electric fence and a ground wire of the electric fence by first and second circuitry, respectively, a third terminal of the three terminal spark gap means being interconnected to a utility ground by a third circuit separate and distinct from the first and second circuits, the third circuit bypassing the energy storing circuit means, the energy charging circuit means, the discharge circuit means, and the voltage multiplying circuit means.

* * * * *

UNITED STATES PATENT AND TRADEMARK OFFICE
CERTIFICATE OF CORRECTION

PATENT NO. : 4,939,618

DATED : Jul. 3, 1990

INVENTOR(S) : Conrad F. Fingerson; Andrew J. McKean; Robert D. Eickhoff

It is certified that error appears in the above-identified patent and that said Letters Patent is hereby corrected as shown below:

Column 1, line 19, "955" should be --995--.

Column 9, line 6, "gasses" should read --gases--.

Column 11, line 2, "associate" should read --associated--.

Signed and Sealed this

Twenty-seventh Day of October, 1992

Attest:

DOUGLAS B. COMER

*Attesting Officer*  *Acting Commissioner of Patents and Trademarks*